W. M. MOSELEY.
SCREW FEED ATTACHMENT FOR TAIL STOCKS OF WATCHMAKERS' LATHES.
APPLICATION FILED AUG. 29, 1911.
1,068,693.
Patented July 29, 1913.
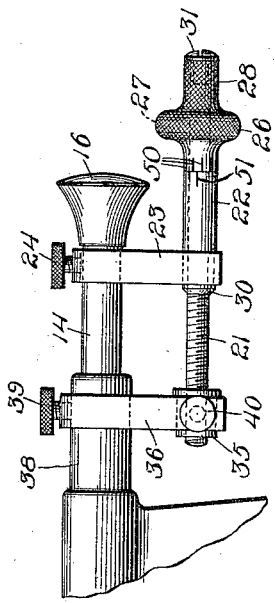
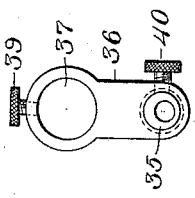
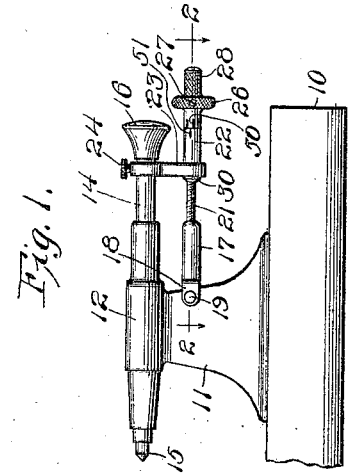
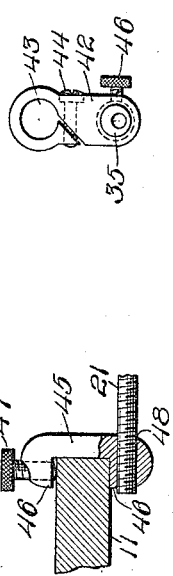
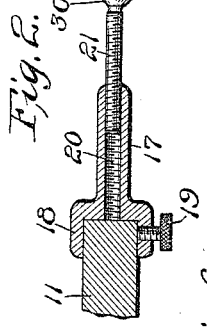
Witnesses:
Inventor:
William M. Moseley
By William L. Hall
Atty.

UNITED STATES PATENT OFFICE.

WILLIAM M. MOSELEY, OF ELGIN, ILLINOIS.

SCREW-FEED ATTACHMENT FOR TAIL-STOCKS OF WATCHMAKERS' LATHES.

1,068,693. Specification of Letters Patent. Patented July 29, 1913.

Application filed August 29, 1911. Serial No. 646,562.

*To all whom it may concern:*

Be it known that I, WILLIAM M. MOSELEY, a citizen of the United States, and a resident of Elgin, in the county of Kane and State of Illinois, have invented certain new and useful Improvements in Screw-Feed Attachments for Tail-Stocks of Watchmakers' Lathes; and I do hereby declare that the following is a full, clear, and exact description thereof, reference being had to the accompanying drawings, and to the characters of reference marked thereon, which form a part of this specification.

This invention relates to a novel attachment for the tail stocks of watchmakers' lathes and refers more specifically to a device in the nature of an attachment to such tail stocks, whereby the ordinary longitudinal, sliding movement of the tail stock spindle may be converted into a screw feed movement for said spindle by the use of a simple and inexpensive attachment that may be applied to an ordinary push spindle tail stock. The movement of a push spindle is usually irregular and uncertain, but by my improved attachment I provide means for securing a very sensitive, accurate and positive screw feed for the spindle, and of such construction that the ordinary tail stock push spindle may be readily converted into a screw feed spindle.

The object of my invention is to provide a low-priced device which may readily be attached, without the use of any tools, to the various watchmakers' lathes now in use, thus at once adapting them to the performance of classes of work which, at present, are done at great disadvantage, inconvenience and expense, on account of the lack of the facilities afforded by my device.

The invention consists in the matters hereinafter set forth and more particularly pointed out in the appended claims.

As shown in the drawings,—Figure 1 is a side elevation of a fragment of a watchmaker's lathe showing the tail stock and a portion of the lathe bed, with my novel attachment applied thereto. Fig. 2 is an enlarged longitudinal section on line 2—2 of Fig. 1. Fig. 3 is a side elevation of a portion of the tail stock of a watchmaker's lathe, showing a modification of my improved attachment. Fig. 4 is a side elevation of the yoke employed in Fig. 3, by which the nut is attached to the tail stock. Fig. 5 is a side elevation of a modified form of yoke for connecting the feed screw nut to the tail stock. Fig. 6 is a detail illustrating a modified form of feed screw nut and means of attaching it to the tail stock.

As shown in the drawing, 10 designates the lathe bed and 11 designates the tail stock formed at its upper end with a bearing or barrel 12 to receive the ordinary push spindle 14 which extends through the barrel for engagement at its inner end 15 with the work, and is provided at its outer end with the usual thumb piece or button 16 by which the spindle may be manipulated in its longitudinal, sliding movements.

My improved screw feed attachment, which is adapted to be applied to lathes of this and like types of lathes, consists of a nut 17, shown in Figs. 1 and 2 as elongated, which is provided at its inner end with a fork, the arms, 18, 18 of which are adapted to fit over the body of the tail stock 11 and are adapted to be clamped to the tail stock by means of the set screw 19, or by other suitable detachable securing means. Said nut 17 is shown as provided with a screw-threaded opening 20 to receive a feed screw 21 that is rotatively mounted in a bearing sleeve 22 which is attached in any suitable manner to the push spindle 14, as by means of the yoke 23. As herein shown said yoke is provided at its upper end with an opening that is fitted over the push spindle and said yoke is clamped tightly to said spindle, as by means of a set screw 24, being thus attached to said spindle near the thumb piece or button 16. The said bearing sleeve 22 is fixedly attached, in any suitable manner to the yoke 23, or it may be integral with same; said yoke being herein shown as provided at its lower end with an opening into which the bearing sleeve is tightly fitted, and may be rigidly connected thereto in any suitable manner. The unscrew-threaded portion of the feed screw 21 extends outwardly beyond the bearing sleeve 22 to receive the peripherally knurled feed wheel or button 26 that is attached to the feed screw in any suitable manner, as for instance, by means of the set screw 27 which extends through the button or feed wheel and impinges at its inner end against the feed screw. The said feed wheel or button 26 may be provided with a smaller diameter, peripherally knurled portion 28, whereby the thumb piece or feed wheel may be turned more or less rapidly to effect a more or less rapid feed action of said feed screw, and the spindle whose movement is controlled thereby. The bearing sleeve 22 and the button or feed wheel 26 are held from endwise movement on the feed screw between a shoulder 30 formed on or attached to the feed screw, and a screw 31 which engages an axial screw-threaded opening in the outer end of the feed screw and the head of which bears against the outer reduced end of the feed wheel or thumb piece.

In assembling the device, preparatory to attaching the same to the tail stock, the bearing sleeve 22, with the yoke 23 attached thereto, is placed over the feed screw before the thumb piece or feed wheel 26 is applied thereto, with its inner end bearing against the shoulder 30. Thereafter the thumb piece or feed wheel 26 is applied to the outer, unscrew-threaded end of the feed screw, against the outer end of the bearing sleeve 22, the screw 27 is fitted in place to thereby fix the thumb piece or feed wheel to the feed screw. The screw 31 is thereafter screwed into the outer end of the feed screw with its head bearing against the feed wheel, and said screw 31 takes the thrust of the feed screw when in operation, and also takes up the end shake of the feed screw in its bearing 22. In attaching the device to the tail stock the feed screw is screwed into the nut 17, and thereafter the spindle is removed from the tail stock and the yoke 23 is slipped thereover until it is brought up to the thumb piece 16, after which said yoke is clamped in place by the thumb screw 24 or otherwise. The spindle is then inserted into the bearing or barrel 12 of the tail stock and, by pressure on the thumb piece 16, the whole device is carried forward until the forks 18 of the nut are brought up against and inclose the rear end of the tail stock. Thereafter the said nut is attached to the tail stock by means of the set screw 19.

In the use of the device the push spindle 14, instead of being moved longitudinally in the ordinary way by means of the thumb piece 16 may now be moved in either direction by the feed screw, either through the medium of the larger or smaller portions of the feed wheel or thumb nut and thus a very accurate, positive and sensitive movement of the spindle is obtained.

When it is desired to use the push spindle in the ordinary way and without the use of the feed screw, this may be accomplished by loosening the set screw 24, whereupon the spindle is disconnected from the feed screw device and the spindle may then be freely slid inwardly and outwardly in its bearings in the tail stock.

In Fig. 3 I have shown a modified form of yoke for connecting the feed screw nut with the tail stock. In this instance the nut, designated by 35, is carried in the lower end of a yoke 26 which is provided at its upper end with an opening 37 whereby the yoke may be slipped over the extension 38 of the tail stock barrel, and may be clamped thereto by the set screw 39. The nut 35 is adjustably mounted in the yoke 36, it being shown as eccentric to engage the opening in said yoke, whereby said nut may be adjusted relatively to the yoke to effect proper alinement of the feed screw with the nut when necessary. The said eccentrically mounted nut is adjustably fixed in the yoke by means of a set screw 40, as best shown in Fig. 4. Instead of mounting the feed screw nut eccentrically in its yoke, the same result may be secured by mounting the bearing sleeve 22 eccentrically on the lower end of the yoke 23.

In place of the yoke 36, shown in Figs. 3 and 4, I may employ the form of yoke 42 shown in Fig. 5. In this latter construction the bearing for the push spindle opening 43 is a split bearing, and said split bearing is clamped upon the tail stock barrel extension by the clamping screw 44 which extends transversely through the split portions of the bearing. In the same manner the yoke 23 may be modified to attach the same to the push spindle.

In Fig. 6 I have shown a modified form of nut 45 which is adapted to be attached to the body of the tail stock 11 in the same general manner as the nut 17 before described. The forks 46, 46 of said nut are applied to the body of the tail stock in the manner illustrated in Fig. 6, the nut 45 being clamped thereto by the set screw 47. In this form of nut the screw-threaded opening 48 thereof is formed at one side of the center plane of the tail stock. In this construction the yoke 23 by which the feed screw is attached to the spindle is swung at its lower end to one side of the vertical plane through the axis of said push spindle.

It is to be understood that the manner of attaching the device to the body or barrel of the tail stock and to the push spindle may be varied from that herein shown, and that the same results may be accomplished by the attachment of the nut to the spindle and the feed screw to the body or barrel of the tail stock. The arrangement herein shown is a very simple and effective one and for these reasons is recommended.

To enable the movement of the spindle to be accurately determined, the feed wheel may be provided with graduation marks 50, and the bearing sleeve 22 provided with a single scale mark 51 as most plainly shown in Figs. 1 and 2, whereby, according to the number of graduation marks, relative to the pitch of the thread of the feed screw, the movement of the spindle may be determined to the thousandth part of an inch, or to the tenth part of a millimeter or any desired range of movement.

I claim as my invention:

1. A screw feed attachment for the tail stock of a push spindle lathe comprising a nut having means to detachably affix it to the rear side of the tail stock, a feed screw having screw-threaded engagement with said nut, a bearing for the feed screw adapted to be arranged parallel to the push spindle, a yoke for connecting the bearing to the push spindle, and a feed wheel detachably affixed to the feed screw, said feed screw being provided with a shoulder between which and the feed wheel said bearing is confined.

2. A screw feed attachment for the tail stock of a push spindle lathe comprising a nut having means to detachably affix it to the tail stock, a feed screw having screw-threaded engagement with said nut, a bearing for the feed screw, a feed wheel detachably affixed to the feed screw, a yoke fixed to said bearing and provided with an opening through which the spindle of the tail stock is adapted to extend, and a clamping means for attaching the yoke to the said spindle, said clamping means being constructed to release the spindle from the yoke, whereby the spindle may be actuated either by the feed screw device or independently thereof.

3. A screw feed attachment for the tail stock of a push spindle lathe comprising a nut having means to detachably affix it to the tail stock, a feed screw having screw-threaded engagement with the nut, a bearing in which said screw is rotively mounted, with means for detachably affixing it to the spindle of the tail stock, said feed screw being provided with a detachably affixed feed wheel, and with a shoulder, between which and said feed wheel said bearing is confined, and a screw having axial screw-threaded engagement with the outer end of the feed screw and bearing against said feed wheel.

In testimony, that I claim the foregoing as my invention I affix my signature in the presence of two witnesses, this 15th day of August, A. D. 1911.

WILLIAM M. MOSELEY.

Witnesses:
WM. L. HALL,
G. E. DOWLE.

---

Copies of this patent may be obtained for five cents each, by addressing the "Commissioner of Patents. Washington, D. C."